(12) United States Patent
Ahn et al.

(10) Patent No.: US 9,606,583 B2
(45) Date of Patent: Mar. 28, 2017

(54) HINGE MODULE APPARATUS

(71) Applicant: Samsung Display Co., Ltd., Yongin-si, Gyeonggi-do (KR)

(72) Inventors: Sungsang Ahn, Hwaseong-si (KR); Taehyeog Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/065,671

(22) Filed: Mar. 9, 2016

(65) Prior Publication Data

US 2016/0349802 A1    Dec. 1, 2016

(30) Foreign Application Priority Data

May 27, 2015 (KR) .................. 10-2015-0074191

(51) Int. Cl.
| | | |
|---|---|---|
| *E05D 15/00* | (2006.01) | |
| *E05D 7/00* | (2006.01) | |
| *G06F 1/16* | (2006.01) | |

(52) U.S. Cl.
CPC .......... *G06F 1/1681* (2013.01); *G06F 1/1652* (2013.01)

(58) Field of Classification Search
CPC ............... Y10T 16/547; Y10T 16/5474; Y10T 16/5475; Y10T 16/541; G06F 1/168; G06F 1/1681; G06F 1/1616; G06F 1/547; E05Y 2900/602; E05Y 2900/606; H04M 1/022; H04M 1/0214; H04M 1/0216; E05D 3/12; E05D 3/122; E05D 3/14; E05D 3/16; E05D 3/06; E05D 11/06; E05D 7/00; E05D 7/06
See application file for complete search history.

(56) References Cited

U.S. PATENT DOCUMENTS

| | | | | |
|---|---|---|---|---|
| 2,805,084 | A | * | 9/1957 | Hall ........................ B42F 21/00 281/5 |
| 3,680,927 | A | * | 8/1972 | Neureuther .......... B23Q 11/085 16/267 |
| 4,665,585 | A | * | 5/1987 | Westin .................... E04F 10/04 16/266 |
| 6,223,393 | B1 | * | 5/2001 | Knopf ................... G06F 1/1681 16/366 |

(Continued)

FOREIGN PATENT DOCUMENTS

| | | |
|---|---|---|
| KR | 10-1346146 B1 | 12/2013 |
| KR | 10-2014-0050504 A | 4/2014 |
| KR | 10-1389442 B1 | 4/2014 |
| KR | 10-2014-0101295 A | 8/2014 |
| KR | 10-1452871 B1 | 10/2014 |

OTHER PUBLICATIONS

Korean Patent Abstracts for KR 10-2013-0073331 A, which corresponds with KR 10-1346146 B1 Listed Above, dated Jul. 3, 2013, 1 page.

(Continued)

*Primary Examiner* — Chuck Mah
(74) *Attorney, Agent, or Firm* — Lewis Roca Rothgerber Christie LLP (57) ABSTRACT

Provided is a hinge module apparatus including first and second bodies configured to respectively support different areas of a flexible display, a plurality of hinge members coupled to each other, and configured to couple the first and second bodies to each other, and coupling members configured to couple adjacent ones of the plurality of hinge members to each other.

14 Claims, 9 Drawing Sheets

(56) References Cited

U.S. PATENT DOCUMENTS

| | | |
|---|---|---|
| 7,532,916 B2 * | 5/2009 | Lee ............... H04M 1/0216 |
| | | 379/433.13 |
| 2007/0117600 A1 * | 5/2007 | Robertson, Jr. ..... H04M 1/0216 |
| | | 455/575.3 |
| 2010/0232100 A1 * | 9/2010 | Fukuma ............ F16G 13/18 |
| | | 361/679.01 |
| 2013/0021762 A1 | 1/2013 | van Dijk et al. |
| 2014/0126133 A1 * | 5/2014 | Griffin ............. G06F 1/1652 |
| | | 361/679.27 |
| 2014/0196254 A1 * | 7/2014 | Song ............... E05D 3/14 |
| | | 16/302 |
| 2014/0226275 A1 * | 8/2014 | Ko ................. G06F 1/1626 |
| | | 361/679.27 |
| 2015/0176317 A1 * | 6/2015 | Lee ................ E05D 3/06 |
| | | 16/251 |
| 2015/0277505 A1 * | 10/2015 | Lim ................ G06F 1/1681 |
| | | 361/679.27 |
| 2015/0277506 A1 * | 10/2015 | Cheah ............. G06F 1/1681 |
| | | 361/679.27 |

OTHER PUBLICATIONS

Korean Patent Abstracts for KR 10-2014-0049911 A, which corresponds with KR 10-1389442 B1 Listed Above, dated Apr. 28, 2014, 1 page.

Korean Patent Abstracts for KR 10-2014-0091275 A, which corresponds with KR 10-1452871 B1 Listed Above, dated Jul. 21, 2014, 1 page.

* cited by examiner

HINGE MODULE APPARATUS

CROSS-REFERENCE TO RELATED APPLICATION

This patent application claims priority to, and the benefit of, Korean Patent Application No. 10-2015-0074191, filed on May 27, 2015, the entire contents of which are incorporated herein by reference.

BACKGROUND

1. Field

The present disclosure herein relates to a hinge module for a flexible display.

2. Description of the Related Art

A flexible display refers to a display that is manufactured by using a thin and flexible substrate that is capable of being bent, folded, or rolled without losing the characteristics of a typical display. A flexible display may be light (e.g., lightweight), relatively thin, have a strong resistance to shock, and may be freely bendable, the characteristics of which are different from those of a typical inflexible display.

A hinge module may be provided for stably folding such a flexible display. However, a limitation with a general hinge module is that an inner surface length is shortened when folded. Because of this limitation, when the flexible display is folded, the hinge module might not stably support the folded area of the flexible display.

SUMMARY

An aspect of the present disclosure provides a hinge module structure that allows a user to stably fold a flexible display.

Another aspect of the present disclosure also provides a hinge module structure that stably supports a folded flexible display.

An aspect of an embodiment of the inventive concept provides a hinge module apparatus including: first and second bodies configured to respectively support different areas of a flexible display; a plurality of hinge members coupled to each other, and configured to couple the first and second bodies with each other; and coupling members configured to couple adjacent ones of the plurality of hinge members to each other, wherein each of the plurality of hinge members includes: an inner protruding part defining a through hole; a hinge slit part configured to accommodate the inner protruding part of an adjacent next hinge member, and configured to guide a rotation path of the inner protruding part of the adjacent next hinge member along a first radius of curvature; an external protruding part; and a guide part configured to accommodate the external protruding part of the adjacent next hinge member, and configured to guide a rotation path of the external protruding part of the adjacent next hinge member along a second radius of curvature.

Each of the coupling members may be in the hinge slit part of a respective one of the hinge members, and may be in the through hole of the inner protruding part of a respective adjacent next hinge member of the hinge members.

A respective one of the coupling members may be configured to move in the hinge slit part when the flexible display is folded.

When the hinge module apparatus is folded, the inner protruding part of each of the hinge members may rotate along the first radius of curvature, and the external protruding part of each of the hinge members rotates along the second radius of curvature.

The first radius of curvature may be less than the second radius of curvature.

The first body may be coupled to a first hinge member of the plurality of hinge members adjacent the first body, and the second body may be coupled to a second hinge member of the plurality of hinge members adjacent the second body.

The first body may include an inner body protruding part defining a through hole, and is coupled to the first hinge member by a respective one of the coupling members in the through hole of the inner body protruding part and in the hinge slit part of the first hinge member.

The body may include a body slit part, and is coupled to the second hinge member by a respective one of the coupling members in the body slit part and in the through hole of the second hinge member.

An inner length of the plurality of hinge members may be substantially a same length whether the hinge module apparatus is folded or unfolded.

The inner length of the plurality of hinge members may be equal to a width of a portion of the flexible display overlapping the plurality of hinge members.

The hinge module apparatus may further include an elastic member passing through the plurality of hinge members and having respective ends coupled to the first and second bodies.

The elastic member may be configured to apply a greater elastic force to the plurality of hinge members when the hinge module apparatus is folded than when the hinge module apparatus is unfolded.

The hinge module apparatus may further include first and second coupling members on the first and second bodies, respectively, to maintain the hinge module apparatus in a folded state.

The first and second coupling members may be configured to be coupled to each other when the hinge module apparatus is folded.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

The terms used in the present disclosure, whenever possible, are general terms that are currently widely used, in consideration of the functions of the present disclosure. These terms, however, may be changed according to the intentions and practices of those working in the present field and the emergence of new technologies. In certain cases, terms arbitrarily selected by the applicant may be used, whereupon the meanings thereof are described in detail in the detailed description of the specification. Thus, the terms used in the present disclosure should be understood not as the simple names of such terms, but in the context of the actual meanings of the terms, and should be interpreted based on the overall content of the present disclosure. In a specific case, terms arbitrarily selected by an applicant may be used. In this case, since the meaning thereof is described in detail in the detailed description of the specification, the present disclosure should be understood in an aspect of meaning of such terms, not the simple names of such terms.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another elements) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. in addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Various embodiments of the inventive concept will be described below in more detail with reference to the accompanying drawings.

In the specification, a flexible display refers to a display manufactured on a flexible substrate that is capable of being bent, folded, or rolled without losing the characteristics of a typical display. For example, the flexible display may be an organic display panel or an electrophoretic display panel. Thus, the display characteristics of the flexible display may not be compromised even when the flexible display is folded.

The hinge module apparatus in the specification refers to an assisting apparatus for more stably assisting the folding of such a flexible display. Hereinafter, the hinge module apparatus will be described in more detail with reference to the accompanying drawings.

Figure 1:
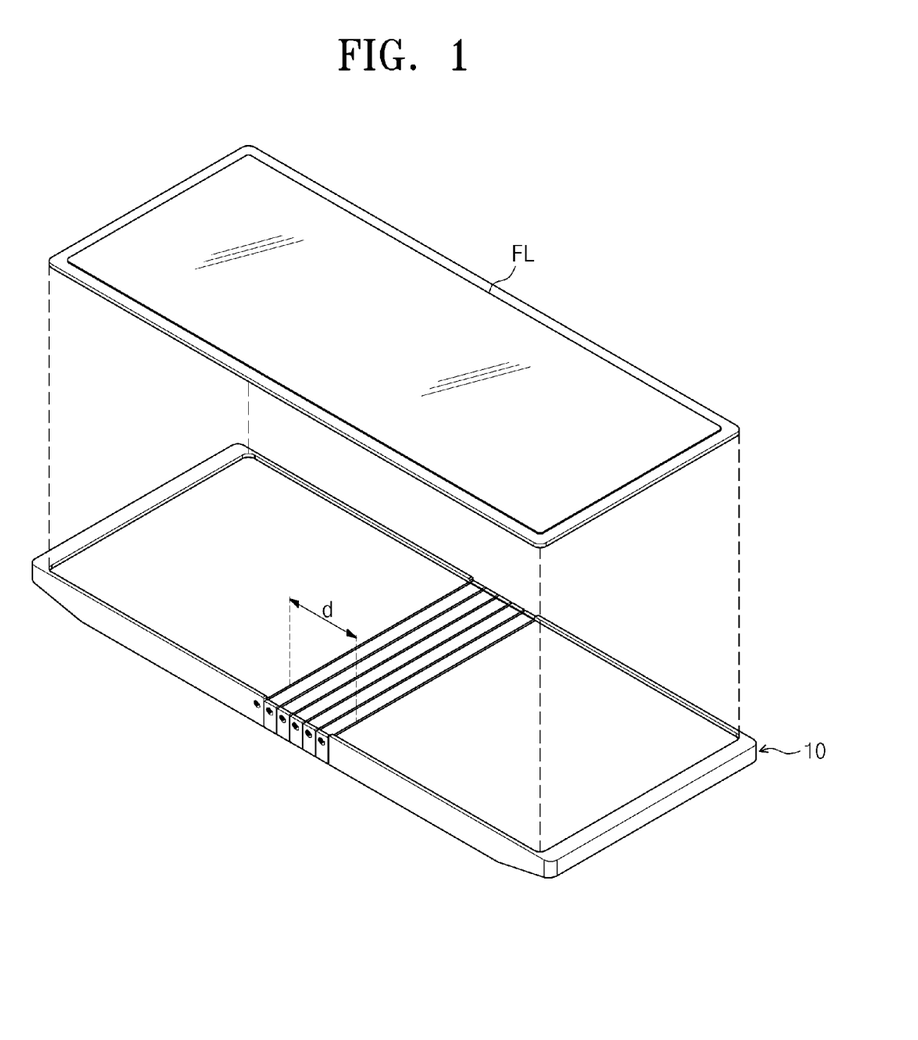
FIG. 1 is a side perspective view of a hinge module apparatus including a flexible display.

FIG. 1 is a side perspective view of a hinge module apparatus including a flexible display.

Referring to FIG. 1, the hinge module apparatus 10 may accommodate a flexible display FL. In the present embodiment, the flexible display FL may be accommodated in the hinge module apparatus 10 so that a rear surface of the flexible display FL contacts a front surface of the hinge module apparatus 10. Here, the rear surface of the flexible display FL may refer to a surface of the flexible display FL on which an image is not displayed. Also, the front surface of the hinge module apparatus 10 may refer to a surface that is not exposed to the outside when the hinge module apparatus 10 is folded.

In the present embodiment, the hinge module apparatus 10 may support at least a portion of the flexible display FL. For example, the hinge module apparatus 10 may support at least a partial area of, or the entire area of, the flexible display FL. The hinge module apparatus 10 supports the attached flexible display FL to assist a user to stably use the flexible display FL.

Also, the hinge module apparatus 10 includes a plurality of hinge members to assist smooth and stable folding and unfolding of the flexible display FL, thereby preventing damage to the flexible display FL that may otherwise be caused by folding and unfolding. When a typical hinge module apparatus is folded, an inner length d of the folded area is reduced when compared to when the hinge module apparatus is unfolded, thereby causing the folded area of the flexible display FL to not be stably supported. Also, the typical hinge module apparatus additionally includes a slide member to compensate for the reduced inner length to overcome the limitation of the unstably supported flexible display FL, thereby increasing manufacturing costs.

To solve these problems associated with a typical hinge module apparatus, the hinge module apparatus 10 of the present embodiment includes hinge members that move in a constant direction during folding to compensate for the reduced inner length while omitting an additional slide member. This will be described in more detail later with reference to FIGS. 2 and 7B.

Figure 2:
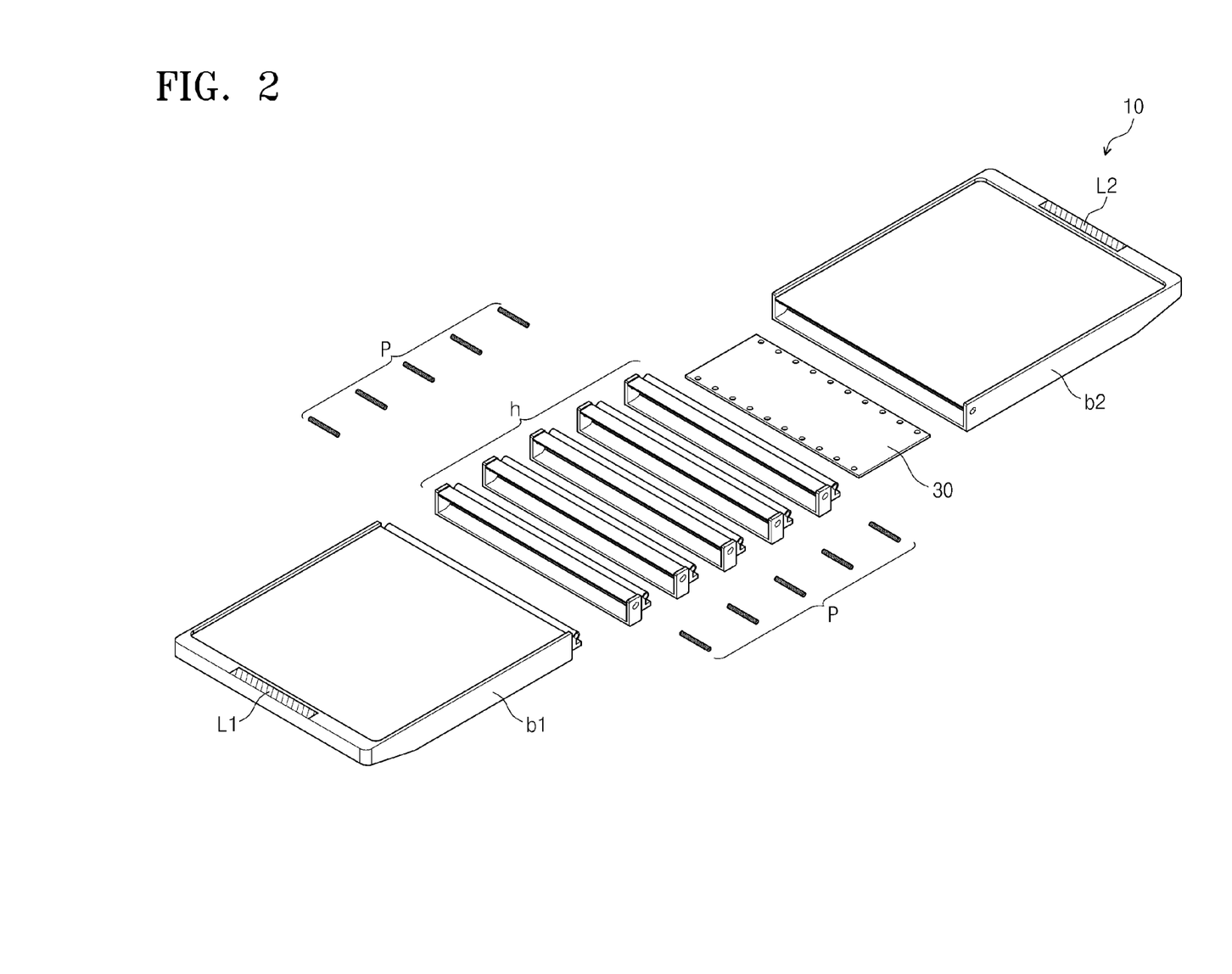
FIG. 2 is an exploded perspective view of a hinge module apparatus.

FIG. 2 is an exploded perspective view of a hinge module apparatus.

Referring to FIG. 2, the hinge module apparatus 10 may include the flexible display FL (FIG. 1), first and second bodies b1 and b2, a plurality of hinge members h, and a plurality of coupling members P.

The first and second bodies b1 and b2 may support the flexible display FL, and may respectively contact and support different areas (e.g., first and second areas) of the flexible display FL. The first and second bodies b1 and b2 may be formed of a rigid material to stably support the flexible display FL, which may be a softer material. As a result, a user may stably secure a view of the overall flexible display FL, and may stably perform a touch input on the flexible display FL. The first and second bodies b1 and b2 may be connected by the plurality of hinge members h, which are coupled to respective ones of each other. Accordingly, one end of each of the first and second bodies b1 and b2 may have a structure to be coupled to a respective adjacent one of the hinge members h, which will be described later in more detail with reference to FIGS. 4A and 4B.

The plurality of hinge members h may connect the first and second bodies b1 and b2, and may be engaged with each other so that the hinge module apparatus 10 is stably folded. Each of the plurality of hinge members h may include protruding parts, and may include uniform inner spaces into which a respective protruding part of an adjacent hinge member may be inserted. Furthermore, the plurality of hinge members h may include slit parts for guiding a rotation path, thereby allowing the hinge members h to rotate at a constant curvature radius during folding. When the hinge module apparatus 10 is folded, as each of the hinge members h rotates along a rotation path that is guided by a respective slit part, the otherwise reduced inner length of the hinge module apparatus 10 may be compensated, which will be described later in more detail with reference to FIGS. 3A and 3B.

The plurality of hinge members h may correspond to a folded area of the flexible display FL. For example, when the flexible display FL is configured to be folded in half, the hinge members h may be at a central portion of the hinge module apparatus 10, as illustrated in the drawings. That is, the hinge members h may be at a position of the hinge module apparatus 10 that corresponds to a folding shaft, or a folding area, of the flexible display FL. Hereinafter, for convenience of description, although a hinge module apparatus accommodating the flexible display FL that is configured to be folded in half will be described as a reference, the present disclosure is not limited to such an embodiment. For example, the description below may be equally applied to the hinge module apparatus 10 for accommodating the flexible display FL having various folding shapes or folding areas.

The coupling members P may couple respective ones of the plurality of hinge members h to each other. The coupling members P may pass through, and may be inserted into, each of the two ends of two respective adjacent hinge members that are engaged with each other to couple the hinge members together. Accordingly, although the coupling members P and the hinge members h may have a two-to-one corresponding relationship, the present disclosure is not limited to above-described embodiment. For example, the coupling members P and the hinge members h may have an n-to-one (where n is a natural number) corresponding relationship according to a folding method, folding shape, or the like of the hinge module apparatus. A detailed description of a specific method for coupling the hinge members h with the coupling members P will be provided below in detail with reference to FIGS. 5A and 5B.

An elastic member 30 may be manufactured of a material having an elastic force. For example, the elastic member 30 may include a rubber band, an extension spring, and the like. The elastic member 30 may have both ends that are respectively coupled to the first and second bodies b1 and b2, and may pass through the plurality of hinge members P to be positioned on the hinge module apparatus 10.

The elastic member 30 may be disposed in the hinge members h to apply an elastic force to the hinge members h so that the hinge module apparatus 10 is converted from a folded state to an unfolded state. That is, the elastic member 30 may apply a certain restoring force, or an unfolding force, to the hinge module apparatus 10 so that the hinge module apparatus 10 is restored from the folded state to the unfolded state. As a result, a user may easily convert the hinge module apparatus 10 from the folded state to the unfolded state without applying additional external force. However, because of the restoring force of the elastic member 30, the folded state of the hinge module apparatus 10 might not be easily maintained. Thus, the hinge module apparatus 10 may further include coupling members L1 and L2 to maintain the folded state of the hinge module apparatus 10.

The coupling members L1 and L2 may be coupled to each other when the hinge module apparatus 10 is folded to thereby maintain the folded state of the hinge module apparatus 10. For example, the hinge module apparatus 10 may include the first and second coupling members L1 and L2 respectively on the first and second bodies b1 and b2. The first and second coupling members L1 and L2 may be at positions corresponding to, or aligning with, each other when the hinge module apparatus 10 is folded. Thus, as the first and second coupling members L1 and L2 contact each other and are coupled to each other while folded, the hinge module apparatus 10 may be maintained in the folded state. To be coupled to each other, the coupling members L1 and L2 may use magnets having opposite polarities and/or may have mechanical structures that are able to couple to each other.

Figure 3A:
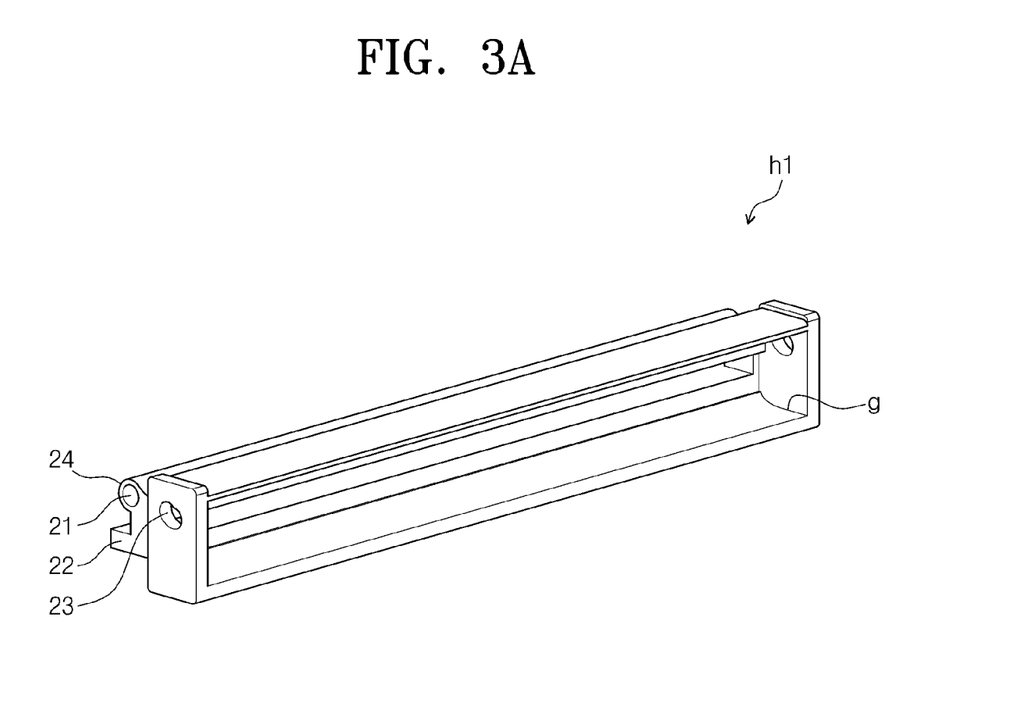
FIG. 3A is a side perspective view of a hinge member.
Figure 3B:
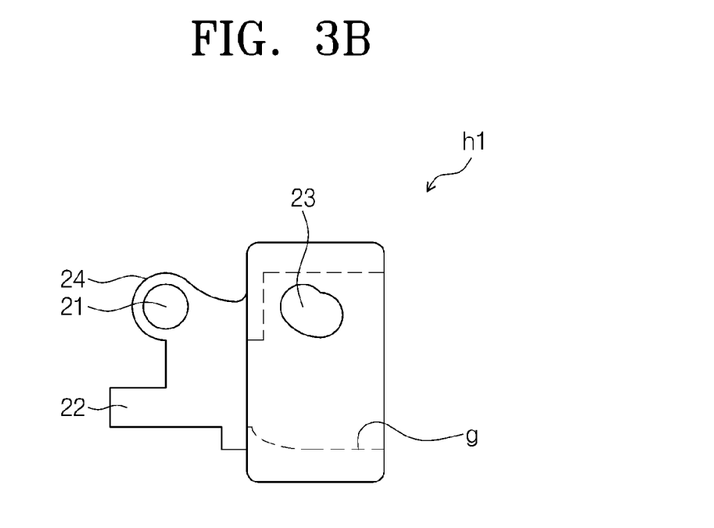
FIG. 3B is a cross-sectional view of the hinge member.

FIG. 3A is a side perspective view of a hinge member, and FIG. 3B is a cross-sectional view of the hinge member.

Referring to FIGS. 3A and 3B, the hinge member h1 may include an inner protruding part 24, a hinge slit part 23, an external protruding part 22, and a guide part g. The above-described configurations may be respectively disposed on both ends (e.g., longitudinal ends) of the hinge member h1. Because the hinge members h are coupled to respective ones of each other, an inner space for receiving the next hinge member may be defined.

The inner protruding part 24 may have a shape protruding in a first direction and may have a through hole 21 defined therein. The inner protruding part 24 may be inserted into the inner space of the preceding (or adjacent) hinge member. The through hole 21 may refer to a hole into which the coupling member P is inserted so that two hinge members (i.e., the preceding adjacent hinge member and the current hinge member) are coupled to each other. A method for inserting the coupling member P will be described below in more detail with reference to FIGS. 5A and 5B.

Figure 6A:
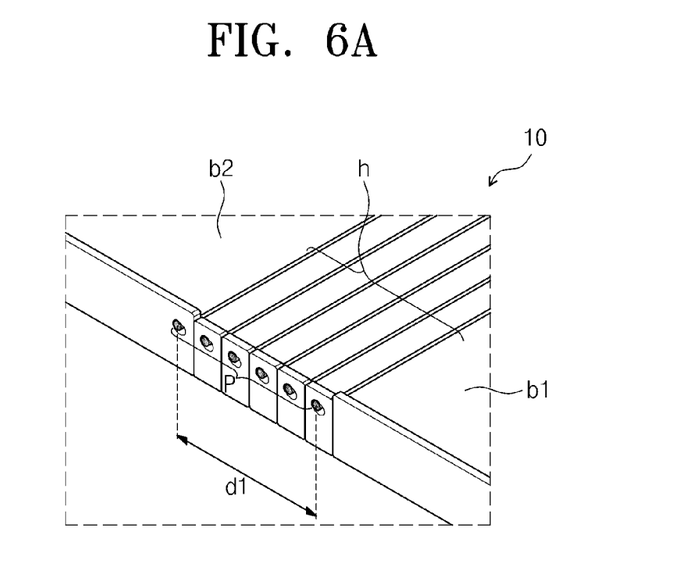
FIG. 6A is a side perspective view of an unfolded hinge module apparatus.
Figure 6B:
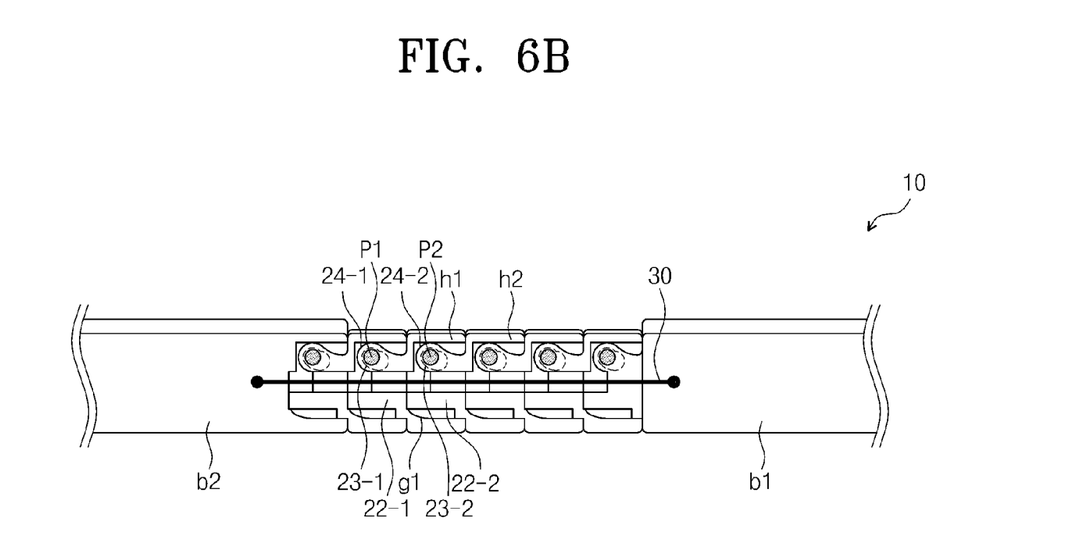
FIG. 6B is a cross-sectional view of the hinge module apparatus in FIG. 6A.
Figure 7A:
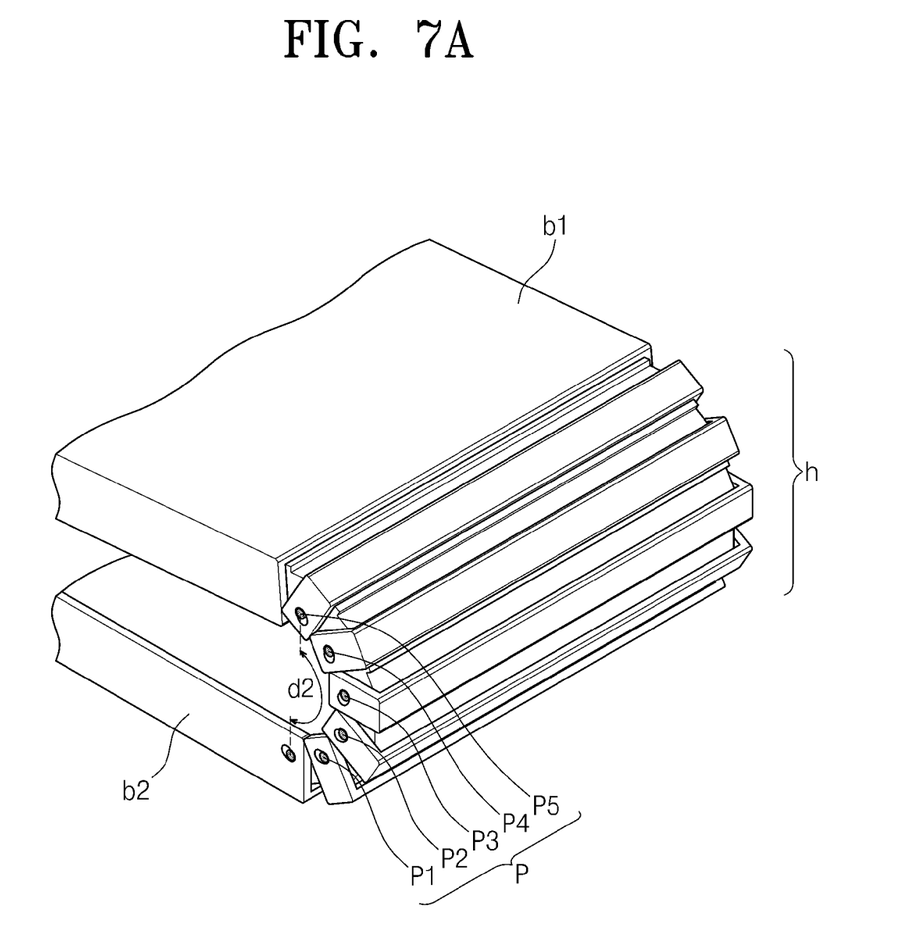
FIG. 7A is a side perspective view of a folded hinge module apparatus.
Figure 7B:
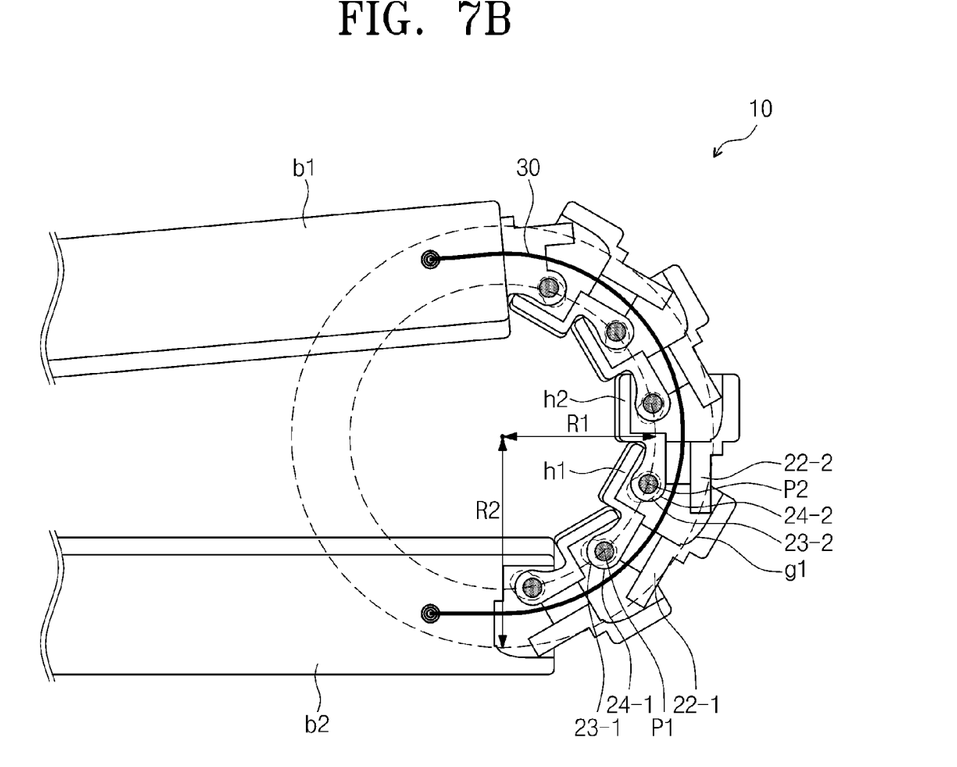
FIG. 7B is a cross-sectional view of the hinge module apparatus in FIG. 7A.

The hinge slit part 23, at which the inner protruding part 24 of the next hinge member is located, may guide a rotation path so that the inner protruding part 24 of the next (or adjacent) hinge member rotates at a first radius of curvature R1 (see FIG. 7B). Here, the coupling member P for coupling the current and next hinge members to each other moves within the hinge slit part 23 according to whether the hinge module apparatus 10 is folded or unfolded. A detailed description thereof will be provided later with reference to FIGS. 6A to 7B. Thus, the hinge slit part 23 may have a shape, size, etc. that are determined in consideration of the folded state, the folding direction, the radius of curvature, etc. of the hinge module apparatus 10.

The external protruding part 22 may have a shape protruding in the first direction parallel to the inner protruding part 24, and may extend in the first direction further than the inner protruding part 24. The external protruding part 22 of the current hinge member may be located at the guide part g of the preceding hinge member to move along the guide part g defined by the preceding hinge member when the hinge module apparatus 10 is folded. As a result, the external protruding part 22 may rotate at a second radius of curvature as the hinge module apparatus 10 is folded. That is, the guide part g of the preceding hinge member serves to guide a moving path of the external protruding part 22 of the current hinge member. Accordingly, as a groove or furrow corresponding to the moving path of the external protruding part 22, the guide part g may be at a position corresponding to the external protruding part 22 of the next hinge member.

Figure 4A:
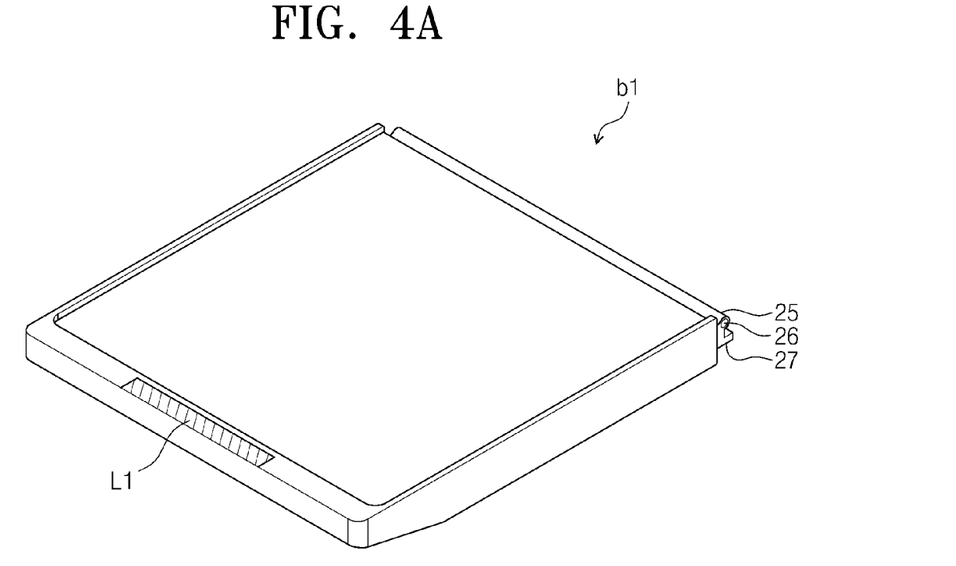
FIG. 4A is a side perspective view of a first body.
Figure 4B:
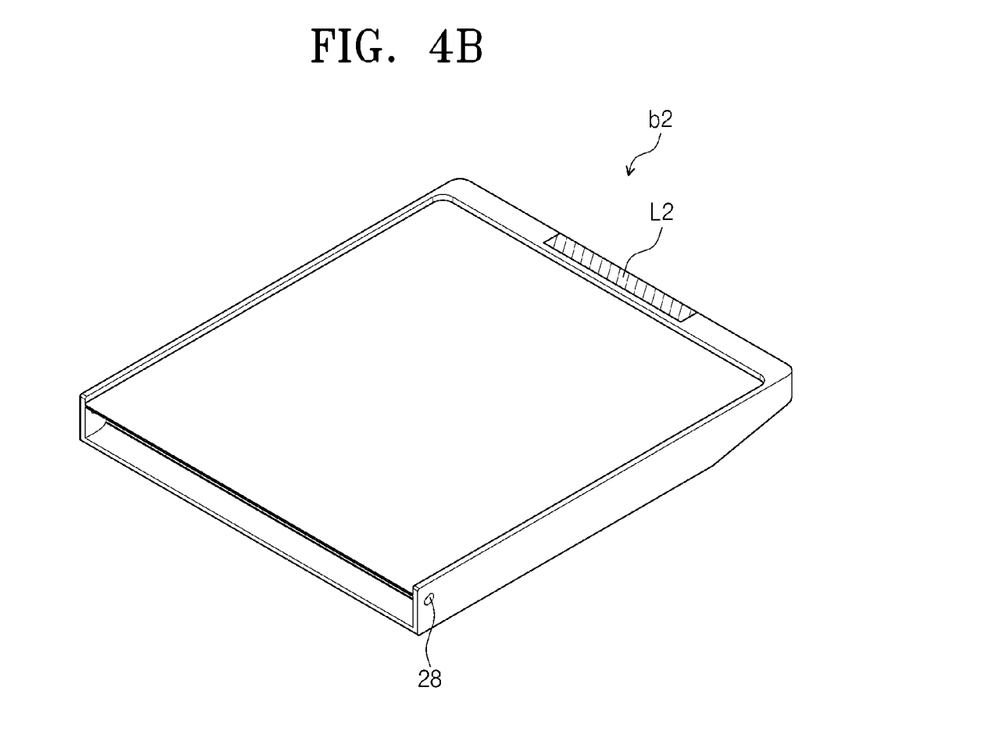
FIG. 4B is a side perspective view of a second body.

FIG. 4A is a side perspective view of a first body, and FIG. 4B is a side perspective view of a second body.

Referring to FIG. 4A, the first body b1 may be configured to be coupled to the hinge members h, and may include an inner body protruding part 25 and an external body protruding part 27. Since the first body b1 is coupled to a first hinge member that is at an outer extremity of the hinge members h (next to the first body b1), the first body b1 may be connected to the second body b2 that is connected to a second hinge member that is located at another outer extremity of the hinge members h (next to the second body b2) through the plurality of hinge members h.

The inner body protruding part 25 and the external body protruding part 27 may extend in the first direction. Also, the inner body protruding part 25 of the first body b1 may include a through hole defined similarly to the inner protruding part 24 of a hinge member h1. Accordingly, in the same method of coupling adjacent hinge members h, the inner body protruding part 25 and external body protruding part 27 of the first body b1 may be inserted into an inner space of the first hinge member, and may be coupled to the first hinge member by the coupling member P that is inserted through the through hole 26 of the inner body protruding part 25 of the first body b1 and through the hinge slit part 23 of the first hinge member.

That is, because the inner body protruding part 25 and the external body protruding part 27 of the first body b1 have the same structure as the inner protruding part 24 and external protruding part 22 of the hinge member h1, the first body b1 may be coupled to the first hinge member using the same method with which adjacent hinge members are coupled. Accordingly, the description of the inner protruding part 24 and external protruding part 22 of the hinge member h1 will similarly apply to the inner body protruding part 25 and the external body protruding part 27 of the first body b1.

Referring to FIG. 4B, the second body b2 may be configured to couple to the hinge members h, and may include a body slit part 28. Because the second body b2 is coupled to the second hinge member at the other outer extremity of the hinge members h (next to the second body b2), the second body b2 may be connected to the first body b1 via the plurality of hinge members h. The second body b2 may include a certain inner space into which the inner protruding part 24 and external protruding part 22 of the second hinge member are inserted to thereby be coupled to the second hinge member.

The body slit part 28 of the second body b2 may perform the same function as the hinge slit part 23 of the hinge member h1. Accordingly, the second body b2 and the second hinge member may be coupled to each other by a coupling member P that is inserted through the through hole 21 of the second hinge member and through the body slit part 28.

That is, because the body slit part 28 of the second body b2 has the same structure as the hinge slit part 23 of the hinge member h1, the second body b2 may be coupled to the second hinge member using the same method with which adjacent hinge members h are coupled. Accordingly, the description of the hinge slit part 23 of the hinge member may be similarly applied to the body slit part 28 of the second body b2.

Figure 5A:
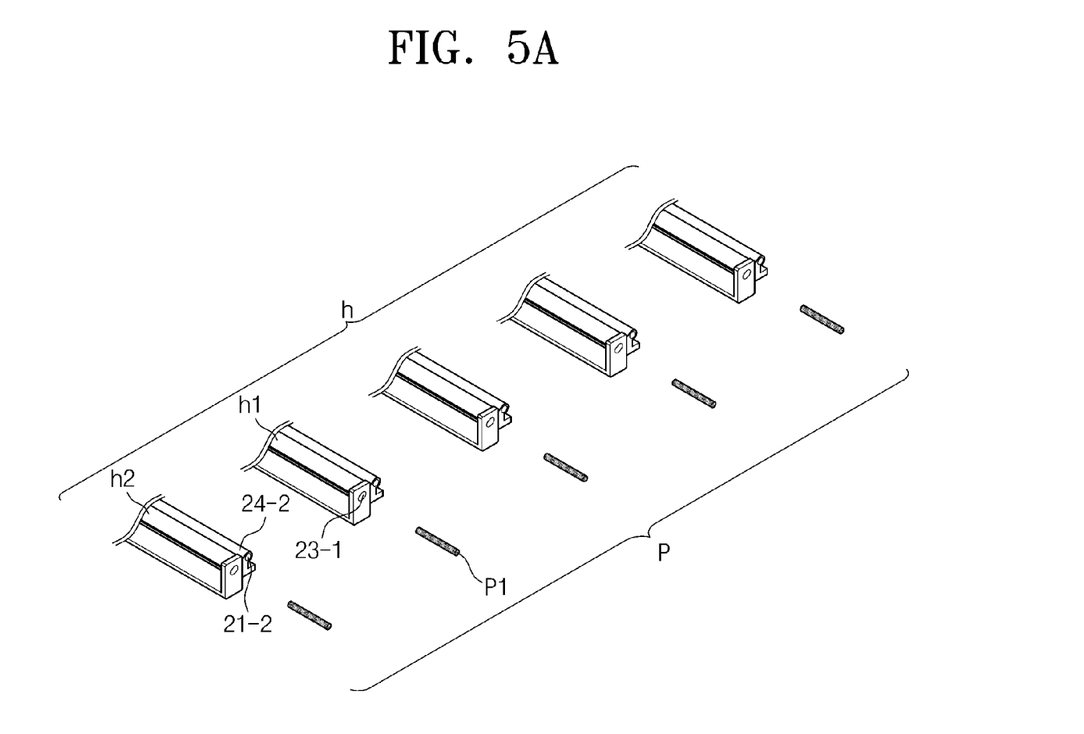
FIGS. 5A and 5B are views illustrating coupling members coupled to hinge members.
Figure 5B:
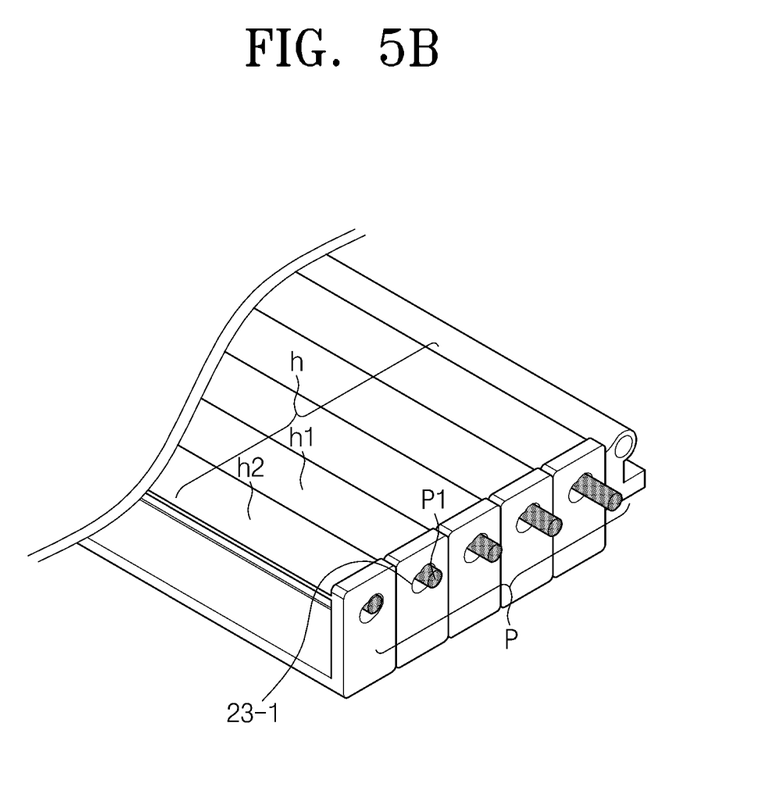

FIGS. 5A and 5B are views illustrating coupling members coupled to hinge members.

Referring to FIGS. 5A and 5B, next/subsequent hinge members are inserted into the inner spaces of preceding/current (or adjacent) hinge members, respectively, and coupling members P are inserted into the through holes of the next hinge members, which are disposed at the hinge slit parts 23 of the preceding/current hinge members to connect adjacent hinge members to each other.

In more detail, when the next hinge members are inserted into the inner spaces of the respective preceding/current (or adjacent) hinge members, an inner protruding part 24-2 of the next (or adjacent) hinge member h2 may be located on a hinge slit part 23-1 of the current hinge member h1. Here, the coupling member P1 may be inserted into a through hole 21-2 defined in the inner protruding part 24-2 of the next hinge member h2 through the hinge slit part 23-1 of the current hinge member h1.

Here, the coupling member P1 may protrude to the outside to be located on the hinge slit part 23-1 of the current hinge member h1 in a state in which the coupling member P1 is not completely inserted into the through hole 21-2 of the next hinge member h2, and a portion of an end of the coupling member P1 is not completely inserted. As a result, the inserted coupling member P1 may allow the two hinge members h1 and h2 to be coupled to each other and, at the same time, may move in and along the hinge slit part 23-1 when the hinge module apparatus 10 is folded. As the coupling member P1 moves along the hinge slit part 23-1, the inner protruding part 24-2 of the next hinge member h2 may rotate along a first rotation path that is guided by the hinge slit part 23-1. A detailed description on the inner protruding part 24-2 rotating along the hinge slit part 23-1 will be provided below with reference to FIGS. 6A to 7B.

The first and second bodies b1 and b2 may be respectively coupled to the first and second hinge members using the same coupling method with which adjacent ones of the hinge members h are coupled to each other. The above description may be equally applied to a method for coupling the first and second bodies b1 and b2 to the first and second hinge members, respectively.

FIG. 6A is a side perspective view of a hinge module apparatus in an unfolded state, and FIG. 6B is a cross-sectional view of the hinge module apparatus in FIG. 6A.

Referring to FIGS. 6A and 6B, in the unfolded state, the inner protruding part 24-2 of the next hinge member h2 may be inserted into the inner space of the current hinge member h1 so that the hinge members h are engaged with each other.

Here, the inner protruding part 24-2 of the next hinge member h2 may be at the hinge slit part 23-1 of the current hinge member h1.

Each of the coupling members P may be located on the left and upper areas of each of the hinge slit parts 23 corresponding thereto. As the hinge module apparatus 10 is folded, each of the coupling members P may move to the right and lower sides along a moving path defined by the hinge slit part 23 corresponding thereto. As a result, the inner protruding parts 24 of the hinge members h may be rotated with a first radius of curvature R1 (see FIG. 7B).

The external protruding parts 22 of the hinge members h may be at respective ones of the guide parts g corresponding thereto. As the hinge module apparatus 10 is folded, each of the external protruding parts 22 may move along a path that is guided by the guide parts g corresponding thereto. In the drawings, a guide part g1 of the current hinge member h1 guides a path in which the external protruding part 22-2 of the next hinge member h2 moves to the right and lower side, such that the external protruding part 22-2 rotates with a second radius of curvature.

The rotational movement of the inner and external protruding parts 24 and 22 in the folded state will be described below in more detail with reference to FIGS. 7A and 7B.

FIG. 7A is a side perspective view of a hinge module apparatus in a folded state, and FIG. 7B is a cross-sectional view of the hinge module apparatus of FIG. 7A.

Referring to FIGS. 7A and 7B, as the hinge module apparatus 10 is folded, the distance between adjacent ones of the hinge members h may become greater, because as the hinge module apparatus 10 is folded, the inner protruding parts 24 and the external protruding parts 22 of the hinge members h rotate while moving equal distances.

In more detail, as the hinge module apparatus 10 is folded, the coupling member P1 moves along a path guided by the hinge slit part 23-1, and, as a result, the inner protruding part 24-1 coupled to the coupling member P1 also moves along the path guided by the hinge slit part 23-1. Here, the hinge slit part 23-1 may have a substantially elongated shape so that the inner protruding part 24-1 rotates. The coupling member P1 may move in a substantially diagonal direction along the path guided by the hinge slit part 23-1, and the inner protruding part 24-1 may generally rotate with the first radius of curvature R1 along the path guided by the hinge slit part 23-1.

As the hinge module apparatus 10 is folded, and as the external protruding part 22-2 moves along a path guided by the guide part g1, the external protruding part 22-2 may generally rotate along the second radius of curvature R2. As the external protruding part 22-2 rotates along a path corresponding to the guide part g1, a malfunction, wherein one or more of the hinge members move or rotate in a different direction while the hinge module apparatus 10 is folded, may be prevented.

As the distances between adjacent ones of the hinge members h become greater when the hinge module apparatus 10 is folded, effects for compensating for the inner length d2 of the hinge module apparatus 10 are realized. Here, the inner side of the hinge module apparatus 10 refers to an inner side surface of the hinge module apparatus 10, which is not exposed to the outside when folded. Also, the inner lengths d1 and d2 of the hinge module apparatus 10 may refer to a distance along a flexible display area that is supported by the plurality of hinge members h. For example, the inner lengths d1 and d2 of the hinge module apparatus 10 may correspond to a distance between outermost coupling members P1 and P5. Accordingly, the inner length of the hinge module apparatus 10 in the unfolded state may be d1 (see FIG. 6A), while the inner length of the hinge module apparatus 10 in the folded state may be d2.

When the typical hinge module apparatus is folded, the inner length thereof is reduced so as to fail to stably support a folded area of the flexible display FL. The typical hinge module apparatus additionally includes a slide member to support the folded area of the flexible display FL, thereby increasing manufacturing costs. According to an embodiment of the inventive concept, however, the inner length that is reduced by the hinge members h rotating along a constant path when folded may be compensated, even without adding a separate slide member.

Accordingly, the hinge module apparatus 10 according to an embodiment of the inventive concept maintains a substantially equal total length of an area supporting the flexible display FL regardless whether the hinge module apparatus 10 is in the folded state or in the unfolded state, thereby stably supporting the flexible display FL regardless of whether the hinge module apparatus 10 is folded. Thus, the inner length dl of the hinge module apparatus 10 in the unfolded state is substantially equal to the inner length d2 of the in the hinge module apparatus 10 in the folded state.

Since the inner lengths d1 and d2 of the hinge module apparatus 10 are maintained substantially equal to each other in the folded and unfolded states, the outer length of the hinge module apparatus 10 in the folded state may increase. Here, the outer side is opposite the inner side, and the outer length refers to a distance along the opposite surface. As a result, the external protruding part 22-2 may have an amount of rotational movement that is greater than that of the inner protruding part 24-1. In other words, the first radius of curvature R1 at which the inner protruding part 24-1 rotates may be less than the second radius of curvature R2 at which the external protruding part 22-2 rotates.

When the hinge module apparatus 10 is folded, the elastic member 30 passing through the hinge members h may increase in length. Accordingly, the elastic force of the elastic member 30 may be increased to apply a restoring/unfolding/straightening force to the hinge members h to thereby restore the hinge module apparatus 10 from the folded state to the unfolded state. As a result, the hinge module apparatus 10 in the folded state may be converted to the unfolded state without applying additional external force. The coupling members L1 and L2 may be respectively located at the first and second bodies b1 and b2 to maintain the folded state of the hinge module apparatus 10, and a detailed description thereof is the same as that provided above with respect to FIG. 2.

According to an embodiment of the inventive concept, because the plurality of hinge members compensate for the length of the inner surface of the hinge module, which is otherwise reduced when folded, the hinge module structure may stably support the folded area of the flexible display.

Furthermore, according to an embodiment of the inventive concept, a user may stably control a folded state of the flexible display.

For convenience of description, although the drawings are separately described, the embodiments illustrated in the drawings may be combined with each other to realize other embodiments. Also, the configurations and methods of embodiments described above are not to be limited, and all or part of the embodiments can be selectively combined so as to derive many variations.

Although embodiments have been described with reference to a number of illustrative embodiments thereof, it should be understood that the present disclosure is not limited to the specific embodiments described above, and it will be apparent that numerous other modifications and embodiments can be devised by those skilled in the art to which the present disclosure pertains without departing from the scope of the claims and their equivalents, and that such modified embodiments should not be understood to be separate from the technical spirit and scope of the present disclosure.

What is claimed is:

1. A hinge module apparatus comprising:
first and second bodies configured to respectively support different areas of a flexible display;
a plurality of hinge members coupled to each other, and configured to couple the first and second bodies with each other; and
coupling members configured to couple adjacent ones of the plurality of hinge members to each other,
wherein each of the plurality of hinge members comprises:
an inner protruding part defining a through hole;
a hinge slit part configured to accommodate the inner protruding part of an adjacent next hinge member, and configured to guide a rotation path of the inner protruding part of the adjacent next hinge member along a first radius of curvature;
an external protruding part; and
a guide part configured to accommodate the external protruding part of the adjacent next hinge member, and configured to guide a rotation path of the external protruding part of the adjacent next hinge member along a second radius of curvature.

2. The hinge module apparatus of claim 1, wherein each of the coupling members is in the hinge slit part of a respective one of the hinge members, and is in the through hole of the inner protruding part of a respective adjacent next hinge member of the hinge members.

3. The hinge module apparatus of claim 2, wherein a respective one of the coupling members is configured to move in the hinge slit part when the flexible display is folded.

4. The hinge module apparatus of claim 3, wherein, when the hinge module apparatus is folded, the inner protruding part of each of the hinge members rotates along the first radius of curvature, and the external protruding part of each of the hinge members rotates along the second radius of curvature.

5. The hinge module apparatus of claim 4, wherein the first radius of curvature is less than the second radius of curvature.

6. The hinge module apparatus of claim 1, wherein the first body is coupled to a first hinge member of the plurality of hinge members adjacent the first body, and
wherein the second body is coupled to a second hinge member of the plurality of hinge members adjacent the second body.

7. The hinge module apparatus of claim 6, wherein the first body comprises an inner body protruding part defining a through hole, and is coupled to the first hinge member by a respective one of the coupling members in the through hole of the inner body protruding part and in the hinge slit part of the first hinge member.

8. The hinge module apparatus of claim 6, wherein the second body comprises a body slit part, and is coupled to the second hinge member by a respective one of the coupling members in the body slit part and in the through hole of the second hinge member.

9. The hinge module apparatus of claim 6, wherein an inner length of the plurality of hinge members is substantially a same length whether the hinge module apparatus is folded or unfolded.

10. The hinge module apparatus of claim 9, wherein the inner length of the plurality of hinge members is equal to a width of a portion of the flexible display overlapping the plurality of hinge members.

11. The hinge module apparatus of claim 1, further comprising an elastic member passing through the plurality of hinge members and having respective ends coupled to the first and second bodies.

12. The hinge module apparatus of claim 11, wherein the elastic member is configured to apply a greater elastic force to the plurality of hinge members when the hinge module apparatus is folded than when the hinge module apparatus is unfolded.

13. The hinge module apparatus of claim 1, further comprising first and second coupling members on the first and second bodies, respectively, to maintain the hinge module apparatus in a folded state.

14. The hinge module apparatus of claim 13, wherein the first and second coupling members are configured to be coupled to each other when the hinge module apparatus is folded.

* * * * *